US008505359B2

(12) United States Patent
Parsadayan et al.

(10) Patent No.: US 8,505,359 B2
(45) Date of Patent: Aug. 13, 2013

(54) SYSTEM AND METHOD FOR DETERMINING A GATE POSITION

(75) Inventors: Alex Parsadayan, Monarch Beach, CA (US); Wayne C. Hom, Coto De Caza, CA (US)

(73) Assignee: Maximum Controls, L.L.C.

( * ) Notice: Subject to any disclaimer, the term of this patent is extended or adjusted under 35 U.S.C. 154(b) by 90 days.

(21) Appl. No.: 13/135,333

(22) Filed: Jul. 1, 2011

(65) Prior Publication Data

US 2013/0000406 A1 Jan. 3, 2013

(51) Int. Cl.
*G01C 25/00* (2006.01)

(52) U.S. Cl.
USPC .......... 73/1.75

(58) Field of Classification Search
None
See application file for complete search history.

(56) References Cited

U.S. PATENT DOCUMENTS

| | | | | |
|---|---|---|---|---|
| 6,118,271 | A * | 9/2000 | Ely et al. | 324/207.17 |
| 7,961,088 | B2 * | 6/2011 | Watts et al. | 340/506 |
| 2010/0097205 | A1 * | 4/2010 | Script | 340/539.1 |
| 2011/0257797 | A1 * | 10/2011 | Burris et al. | 700/282 |

* cited by examiner

*Primary Examiner* — Robert R Raevis
(74) *Attorney, Agent, or Firm* — Leonard Tachner

(57) ABSTRACT

A system and method for determining the position of a moveable barrier relative to the fully open position and fully closed position. The invention utilizes in a preferred embodiment a geo-magnetic sensor to determine the extent to which the barrier has traveled from reference position of fully open or fully closed to some intermediate point. A multi-axis sensor provides an output which changes during the barrier's excursion relative to each of the respective axes so that direction or tilt may be readily known in between the closed and open positions. Operation of the gate or barrier may be more efficiently controlled when its precise location between open and closed is known.

4 Claims, 3 Drawing Sheets

SYSTEM AND METHOD FOR DETERMINING A GATE POSITION

BACKGROUND OF THE INVENTION

1. Field of the Invention

The present invention relates generally to methods and devices for controlling the operation of moveable barrier operators. More specifically, the invention relates to determining the precise position of a moveable barrier relative to the fully open position and fully closed position.

2. Background Art

Moveable barrier operators are automated systems which are utilized to move a barrier between a fully open position and a fully closed position. Some examples of moveable barriers are sliding gates, swing gates, and barrier arms. A typical moveable barrier operator consists of a motor coupled to a drive train attached to the moveable barrier to move the barrier between a fully closed position and a fully open position.

Prior systems have typically used a variety of physical mechanical stops, mechanical limit switches or magnetic sensors to determine the fully open or fully closed positions. Others have incorporated encoders to count the number of pulses between the fully open or fully closed positions or resistive potentiometers to determine positioning of the moveable barrier.

The limit switches and magnetic sensors provide an indication only if the moveable barrier is at the fully open or fully closed position. Any other position of the moveable barrier is indeterminate. An encoder may be accurate in determining the barrier position as long as the counter circuitry's power is not interrupted or the barrier is not mechanically released from the drive train. In such cases, true position is lost and indeterminate until the moveable barrier has been driven to either a fully open or fully closed position. Resistive potentiometers need to be coupled such that they are indicative of the pivot point of the moveable barrier and being an electromechanical device, they are susceptible and prone to failure due to wear from the device's wiper on the resistive element.

SUMMARY OF THE INVENTION

The present invention comprises a system and method for determining the position of a moveable barrier. A geo-magnetic sensor is mounted relative to the moveable barrier such that any movement of the moveable barrier is directly translated into a proportional movement of the sensor in an "X", "Y", or "Z" direction or any combination thereof to indicate an angular displacement or offset from a fully open or fully closed position of the moveable barrier.

In one embodiment of the invention, a sensor is placed on a barrier arm or drive shaft directly connected to the barrier arm. The lower position of the barrier arm (closed position) is indicated by a zero degree tilt angle and the upper position of the barrier arm (open position) is indicated by a ninety-degree tilt angle. This system requires only an adjustment for zero degree tilt angle offset for normal operation of the barrier arm. By reading the sensor's angular output, determinations can be made for acceleration and deceleration points as well as final stop points for the fully open and fully closed positions.

In the case of a swing gate, a sensor is coupled to the output of the drive train that is directly connected to the moveable barrier. The fully open position and fully closed position are determined as a rotational angular measurement relative to the Earth's magnetic poles. The precise angular placement of the moveable barrier relative to the Earth's magnetic poles is inconsequential as long as the fully open position and fully closed position's angular measurements are known to the control system.

Thus a system and method are provided where a moveable barrier's position can be determined based on the angular tilt or angular rotation of a sensor.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION OF A PREFERRED EMBODIMENT

Figure 1:
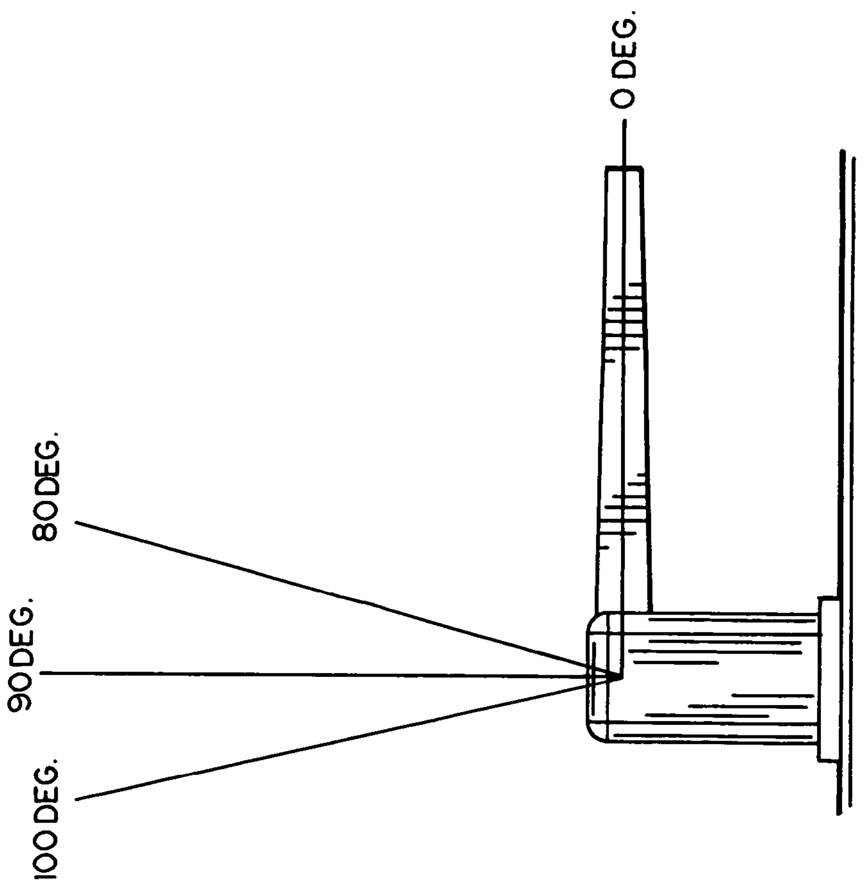
FIG. 1 is a schematic diagram illustrating tilt angle in a barrier arm gate.

The present invention may be considered to be based upon a limited electronic compass which need determine only relative direction between a fully open and a fully closed gate. In general, compasses determine geographic orientation with reference to the Earth's magnetic field, which generally runs north and south for most populated parts of the Earth. As the magnetic poles of the Earth are not located in the same position as the Earth's geographic poles, there is an error between the geographic (true) and magnetic (compass) headings, which is called variation. Variation is location and time dependent. Conventional compasses employ a freely moveable, magnetically sensitive member, which aligns itself with the Earth's magnetic field and points toward the Earth's magnetic north pole.

Electronic compasses, on the other hand, determine geographic orientation without using a magnetically sensitive member. In general, electronic compasses determine geographic orientation by simultaneously measuring the magnitude of the Earth's magnetic field in at least two different directions, which are related to each other at a known angle. Because the measurements are dependant upon the orientation of the measuring device, they can be used to determine the deviation of the compass's orientation from magnetic north, which gives the compass heading.

In most other applications compasses held on a moving body are not usually confined to perfectly horizontal orientations. Using aviation convention, tilt is defined as either pitch or roll relative to the local horizontal plane; pitch is the angle between an aircraft's longitudinal axis and the local horizontal plane (positive for nose-up pitch) and roll is the angle of rotation about the longitudinal axis (positive for right wing down).

Typically, 3-axis electronic magnetic sensors have been used in conjunction with 2-axis tilt sensors to overcome inaccuracies that occur due to tilt. Three-axis magnetic sensors measure the Earth's magnetic field in mutually orthogonal directions.

Electronic compasses are now available as chipsets that can be output to a graphic display. These chips are in two types, two-axis and three-axis. In two-axis chips, the accuracy of the output is dependent upon how level the compass is held. Three-axis chips utilize the third axis to sense tilt and compensate for it, making them inherently more accurate.

The tilt angles are measured with an accelerometer. In addition to measuring the tilt angles, the X, Y and Z magnetic components will be measured. These are the axes relative to the Earth's north/south magnetic lines. They are measured with magnetoresistive sensors.

Accelerometers are available in different varieties (including 1, 2 or 3 axes) and different types (including piezoelectric, piezo-resistive, capacitive and thermal). They are also available and preferred in single-chip digital solutions, which means that the output of the accelerometer chip can be directly interfaced into a microcontroller's I/O pin.

Figure 2:
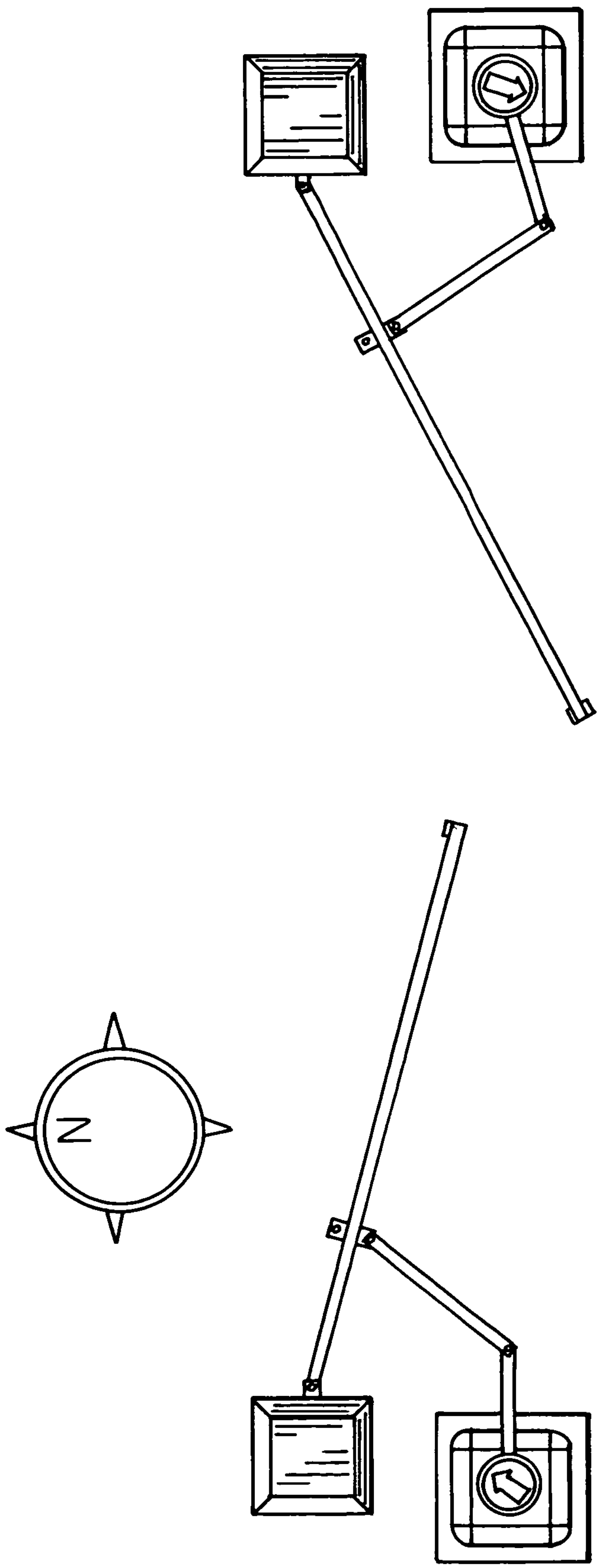
FIG. 2 is a schematic diagram illustrating geo-magnetic direction in a double swing gate.

In the present invention, the application is relatively limited because the automatic gate always travels along the same path between fully open and fully closed, irrespective of the type of gate. FIG. 1 for example, shows a barrier arm gate wherein when fully closed, the barrier is substantially horizontal (i.e., 0°) and when fully open, the barrier is substantially vertical (i.e., 90°). The tilt angle measurement between these two reference points is the principal measurement goal of the invention herein. Similarly, FIG. 2 shows a double swing gate wherein the fully open position has the two gates in a substantially parallel south-pointing direction and fully closed has the two gates in a substantially collinear, east and west-pointed direction. In each example of FIGS. 1 and 2, a small circuit chip (see FIG. 3) is positioned on the respective arms. The output of each sensor is then calibrated for the reference positions of the arms, namely for, completely open end completely closed. Then the intermediate arm responses are determined for the desired resolution of arm position. For example, in the case of the barrier arm of FIG. 1, 5° resolution is probably adequate for purposes of selected acceleration and deceleration to increase the efficiency of gate operation. More specifically, a barrier arm would be programmed to run relatively fast between 5° and 85°, but run slowly in opening between 85° and 90° and run slowly in closing between 5° and 0°. In the case of double swing arm gate of FIG. 2, it might be preferred to provide a 1° resolution in order to more precisely track the two arms to operate symmetrically and to accelerate only in closing while operating more slowly in opening in order to provide greater safety.

Figure 3:
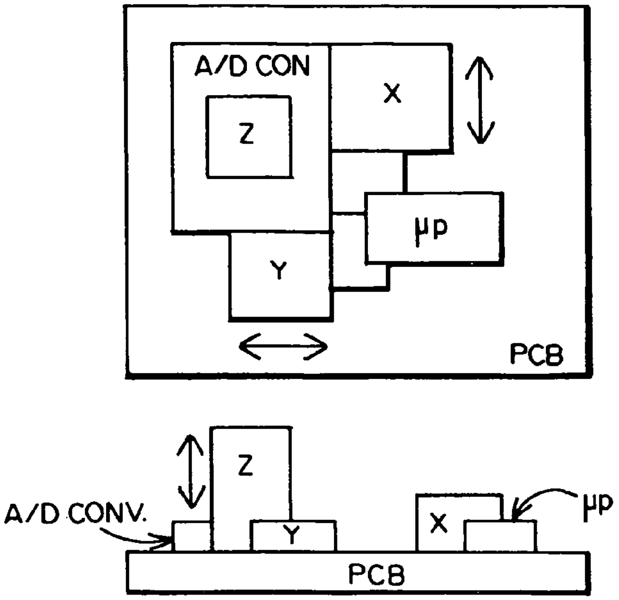
FIG. 3 is a schematic diagram of a 3-axis geo-magnetic detector chip that may be used in a preferred embodiment of the present invention.
Figure 4:
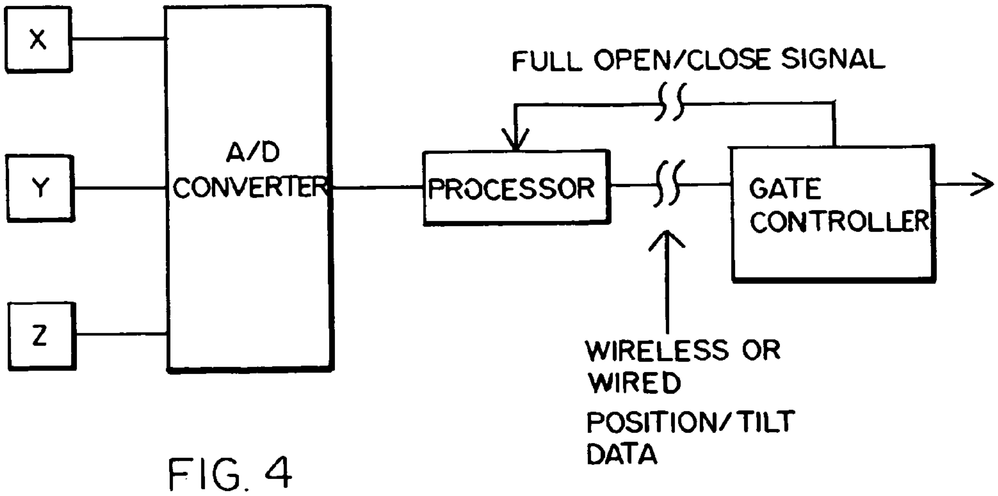
FIG. 4 is a block diagram of a gate position sensor system according to a preferred embodiment of the present invention.

FIG. 4 provides a block diagram showing how the sensor chip of FIG. 3 integrates into a standard gate system. As shown therein, each directional geo-magnetic sensor is connected to an A/D converter and to a pp which is wirelessly connected to the gate controller.

It will now be understood that the present invention provides a system and method for keeping track of precise gate position in an automatic gate when it is between open and closed positions. This capability permits the gate controller to enhance gate operation to make it more efficient, such as by accelerating and decelerating gate movement during opening and closing. Geo-magnetic sensors and/or accelerometers are used to determine precise gate position between fully open and fully closed configurations by use of the Earth's magnetic field and gravity to provide an electronic output indicative of direction and tilt. An exemplary embodiment of a barrier gate and of a double swing gate are provided to illustrate the operation in two different versions. However the scope hereof should be limited only by the appended claims.

We claim:

1. A method of determining precise position of a moveable gate when it is between fully open and fully closed positions; the method comprising the steps of:

mechanically coupling at least one direction sensitive sensor with said moveable gate;

calibrating said sensor based on its varying output as a function of its direction relative to the Earth's magnetic field between gate positions of fully open and fully closed;

transferring said direction output to controller of said moveable gate to control gate movement as a function of its relative position between fully open and fully closed.

2. The method recited in claim 1 wherein said sensor outputs at gate positions of fully open and fully closed are used as reference data limits of gate movement.

3. The method of claim 1 wherein said sensor comprises a magnetoresistive sensor.

4. The method of claim 1 wherein said sensor comprises a multi-axis magnetoresistive sensor.

* * * * *